H. R. STAFFORD.
LOCOMOTIVE SIDE ROD.
APPLICATION FILED NOV. 23, 1916.
1,222,247.
Patented Apr. 10, 1917.
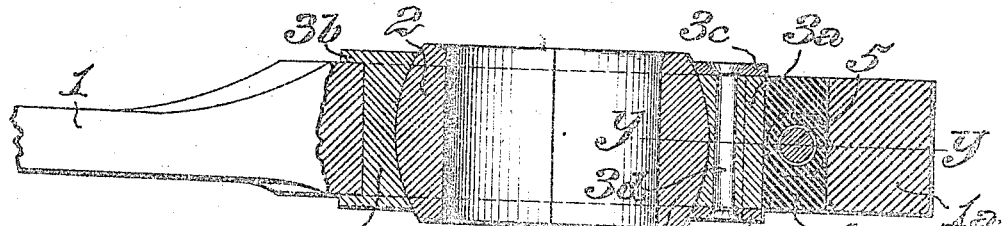
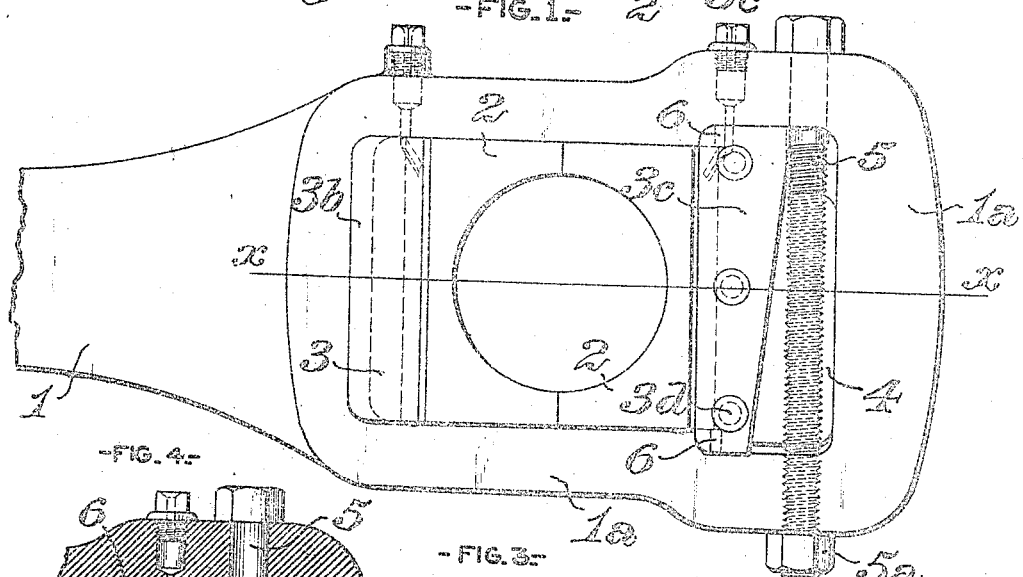
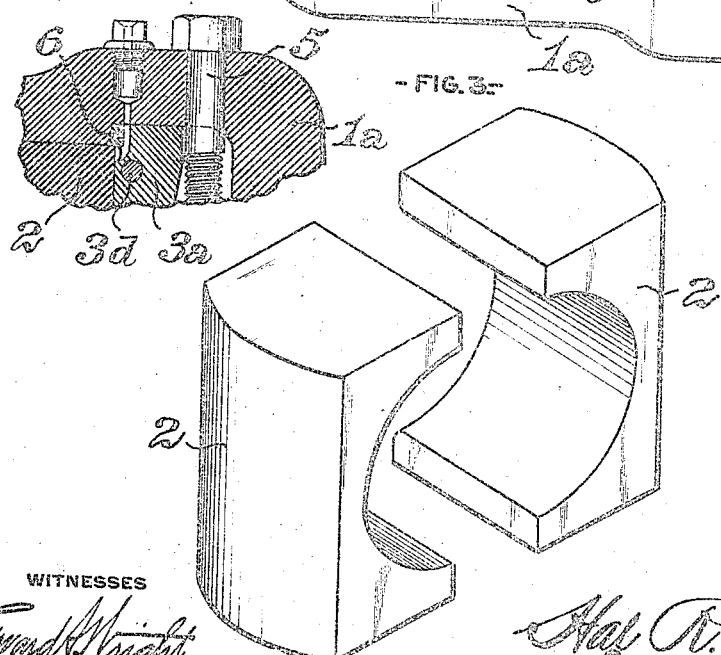
WITNESSES
INVENTOR

UNITED STATES PATENT OFFICE.

HAL R. STAFFORD, OF PLAINFIELD, NEW JERSEY, ASSIGNOR TO ECONOMY DEVICES CORPORATION, OF NEW YORK, N. Y., A CORPORATION OF NEW YORK.

LOCOMOTIVE SIDE ROD.

1,222,247. Specification of Letters Patent. Patented Apr. 10, 1917.

Application filed November 23, 1916. Serial No. 132,972.

*To all whom it may concern:*

Be it known that I, HAL R. STAFFORD, of Plainfield, in the county of Union and State of New Jersey, have invented a certain new and useful Improvement in Locomotive Side Rods, of which improvement the following is a specification.

My invention relates to coupling or "side" rods, for coupling adjacent driving wheels of a locomotive engine, and its object is to provide an appliance of such type, in the application of which the swiveling movement, in a horizontal plane, which is necessary in connection with floating or lateral motion driving axles, may be permitted without cramping or binding, and suitable facilities be embodied for adjustment, as from time to time required by wear of the parts.

The improvement claimed is hereinafter fully set forth.

In the accompanying drawings: Figure 1 is a side view, in elevation, of a locomotive side rod stub end, illustrating an application of my invention; Fig. 2, a horizontal section, through the same, on the line $x$ $x$ of Fig. 1; Fig. 3, an isometrical view of the brasses detached; and, Fig. 4, a partial vertical section on the line $y$ $y$ of Fig. 2.

In the practice of my invention, which, in the instance shown, is applied in a solid ended side rod, 1, the stub end, 1$^a$, of the rod which is to be coupled to the crank pin of a driving wheel secured on a lateral motion or floating driving axle, is cut out to provide a substantial rectangular opening, the top and bottom of which are plane and horizontal, the ends of which are plane and vertical, and the outer end portion of which is of greater depth than the portion adjoining the body of the rod, thereby forming upper and lower shoulders in the opening. The members through which the rod is coupled to the crank pin, and by which the required adjustment is effected, are located in said opening, and will now be described.

Two half crank pin bearings or brasses, 2, 2, are fitted in the shallower portion of the opening of the stub end, 1$^a$, said brasses being parted vertically, and turned to present surfaces which are segments of cylinders, concentric with the vertical axis of the brasses, as shown in Figs. 2 and 3, and being bored out cylindrically, to fit a crank pin, in a horizontal plane. An inner bearing block, 3, the vertical outer face of which is plane, and the vertical inner face of which is bored cylindrically in correspondence with the vertical curvature of the brasses, 2, 2, is fitted between one of said brasses and the end of the opening of the stub end, 1$^a$, which adjoins the body of the rod, and an outer bearing block, 3$^a$, the vertical inner face of which is bored cylindrically, similarly to the block, 3, and the opposite face of which is inclined, is fitted in the deeper portion of the opening of the stub end, and against the adjoining brass, 2. A wedge, 4, is fitted between the inclined side of the block, 3$^a$, and the outer end wall of the opening of the stub end, and is forced to desired bearing on the block by means of an adjusting bolt, 5, which passes through the top and bottom of the stub end, and engages a thread in the wedge, said bolt being drawn to desired bearing by a nut, 5$^a$.

It being of prime importance that the brasses, 2, 2, shall swivel freely in the stub, it is necessary that the adjustment of the blocks upon them shall be effected with precision. To this end, transversely extending liners, 6, 6, are interposed between the upper and lower shoulders of the opening in the stub end and the adjoining block, 3$^a$, which is recessed at its top and bottom to receive them. The inward movement of the block, 3$^a$, that is to say, its movement toward the horizontal axis of the crank pin brasses, being limited by the liners, 6, 6, it will be seen that by filing them to the proper width, as from time to time required to compensate wear of the parts, accurate adjustment will be attained.

In order to prevent lateral displacement of the block, 3, it may be provided with side flanges, 3$^b$, and to admit of readily machining the upper and lower recesses of the block, 3$^a$, in which the liners, 6, 6, are seated, as well as to prevent endwise movement of the liners, detachable side plates, 3$^c$, which project over the liners, as shown in Fig. 1, may be secured to said block by rivets, 3$^d$, or bolts.

A side rod of the construction above described presents the advantages of permitting the required degree of free swiveling movement in a horizontal plane, without involving complicated or expensive structure, or liability to cramping in operation, and of being capable of accurate adjustment to compensate wear.

I claim as my invention and desire to secure by Letters Patent:

1. The combination of a locomotive side rod, having a substantially rectangular opening in one of its stub ends; a pair of crank pin brasses, fitted in said opening and turned cylindrically in a vertical plane; a correspondingly bored inner bearing block, interposed between the inner end of the opening and the adjacent crank pin brass; an outer bearing block having a cylindrically bored inner surface abutting on the adjacent crank pin brass; means for imposing pressure on the outer bearing block; and adjusting means, interposed between said block and the stub end.

2. The combination of a locomotive side rod, having a substantially rectangular opening in one of its stub ends, the outer portion of said opening being deeper than the inner, thereby forming upper and lower shoulders; a pair of crank pin brasses, fitted in the inner portion of said opening and turned cylindrically in a vertical plane; a correspondingly bored inner bearing block, interposed between the inner end of the opening and the adjacent crank pin brass; an outer bearing block, fitted in the outer portion of the opening and having a cylindrically bored inner surface abutting on the adjacent crank pin brass; means for imposing pressure upon the outer bearing block; and adjustable liners, interposed between said block and the shoulders of the stub end opening.

HAL R. STAFFORD.

Witnesses:
JOHN J. WING,
CHARLES F. PRESCOTT.